E. C. BERRIMAN.
MEASURING INSTRUMENT.
APPLICATION FILED DEC. 26, 1916.
1,254,197.
Patented Jan. 22, 1918.
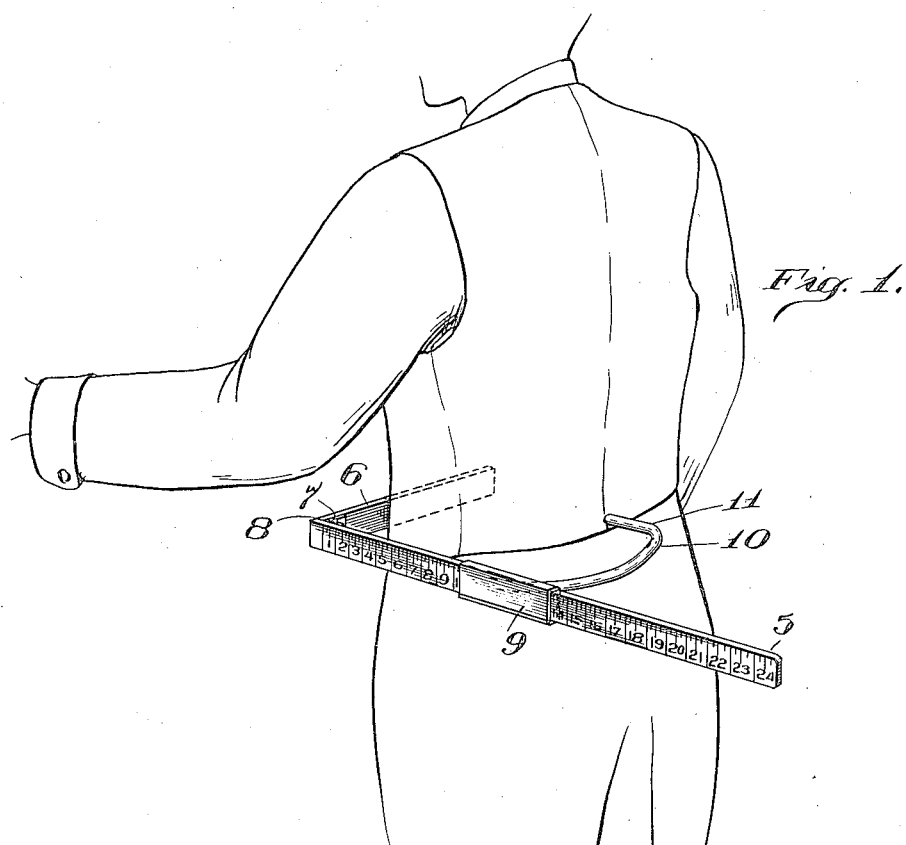
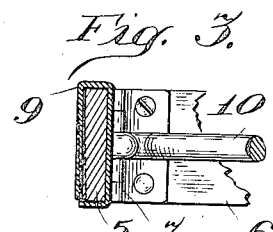
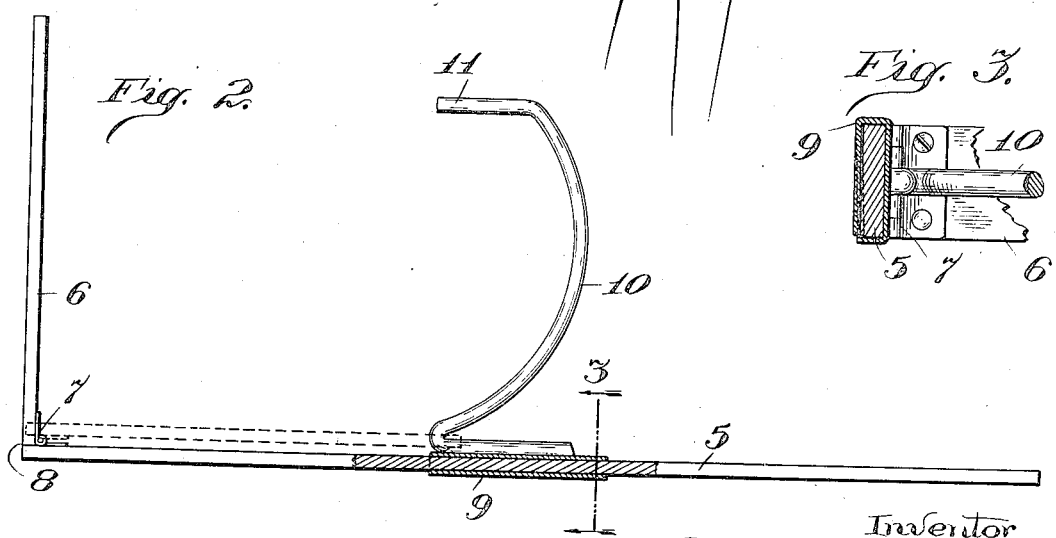

UNITED STATES PATENT OFFICE.

EDWARD C. BERRIMAN, OF CHICAGO, ILLINOIS.

MEASURING INSTRUMENT.

1,254,197.
Specification of Letters Patent.
Patented Jan. 22, 1918.

Application filed December 26, 1916. Serial No. 138,815.

*To all whom it may concern:*

Be it known that I, EDWARD C. BERRIMAN, a citizen of the United States, residing at Chicago, in the county of Cook and State of Illinois, have invented certain new and useful Improvements in Measuring Instruments, of which the following is a specification.

My invention relates to a measuring instrument and has for its primary object the provision of means for accurately measuring the depth of the human figure at the waist and in the medial plane of the figure, the instrument being particularly adapted for use in determining one of the measurements essential to the construction of garments to properly fit the individual measured.

Further objects and advantages of my invention will be apparent as it is better understood by reference to the following specification when read in connection with the accompanying drawing, illustrating the preferred embodiment thereof, in which—

Figure 1 is a view in perspective illustrating the mode of using my invention;

Fig. 2 is a side elevation of the invention, and

Fig. 3 is an enlarged section on the line 3—3 of Fig. 2.

The back of the normal human figure at the waist is concavely curved, the medial line adjacent the backbone being disposed inwardly of that portion of the figure adjacent the sides while the front of the figure is convexly curved. In order to accurately determine the depth of the figure it is essential that the measuring instrument be provided with a contact finger of limited area for engagement with the back at the medial line of the figure and shaped to avoid the more prominent portion of the back adjacent the sides of the figure.

Referring to the drawing, 5 indicates a straight guide member calibrated as indicated in Fig. 1. An arm 6 is connected to the member 5 adjacent one end by a hinge 7, the member 5 extending beyond the hinge 7 to provide an abutment 8 which limits the swinging movement of the arm 6 at a perpendicular position as indicated in Fig. 2. The slide 9 is loosely mounted on the member 5 and supports a finger 10 which curves outwardly and is provided at its free end with an inwardly directed tip 11, the end of which is disposed in a line perpendicular to one edge of the slide 9 so that this edge indicates on the calibrations the perpendicular distance of the tip 11 from the inner face of the arm 6.

The mode of using my invention will be apparent from an inspection of Fig. 1 of the drawing. The arm 6, being in the position indicated in Fig. 2 of the drawing, is disposed adjacent the front of the figure to be measured and the slide 9 is adjusted until the tip 11 engages the back of the figure at the medial line. The depth of the figure may then be read on the scale. While designed particularly for use in the manner illustrated my invention is useful for obtaining various other measurements as will be at once apparent. When not in use the arm 6 may be folded against the member 5 and the slide 9 bearing the finger 10 may be slipped from the member 5 so that the device may be packed in a relatively small space.

It will be understood that I have perfected a compact measuring device adapted to obtain a measurement which cannot be secured except with means substantially identical with that described herein. My invention is admirably adapted to accomplish its function and is relatively inexpensive.

It will be apparent that various changes may be made in the form, construction and arrangement of the parts without departing from the spirit and scope of the invention or sacrificing any of its material advantages, the form hereinbefore described being merely a preferred embodiment thereof.

I claim:

A measuring instrument comprising a straight calibrated member, a straight arm hingedly connected to said member, said member providing an abutment which limits outward swinging movement of said arm when the latter is disposed normally with respect to said member, a slide on said calibrated member, and a finger secured to said slide and movable therewith, said finger being outwardly curved adjacent said slide and having an inwardly directed tip at its free end opposite the free end of said arm, the calibrations on said member indicating the perpendicular distance from said arm to the tip of said finger.

EDWARD C. BERRIMAN.

Witnesses:
WM. O. BELT,
M. A. KIDDIE.